United States Patent [19]
Chen

[11] Patent Number: 5,326,921
[45] Date of Patent: Jul. 5, 1994

[54] ALCL₃-CATALYZED PROCESS FOR PREPARING POLY-N-BUTENES FROM MIXED BUTENES

[75] Inventor: Frank J. Chen, Edison, N.J.

[73] Assignee: Exxon Chemical Patents Inc., Linden, N.J.

[21] Appl. No.: 947,904

[22] Filed: Sep. 18, 1992

Related U.S. Application Data

[63] Continuation of Ser. No. 823,120, Jan. 21, 1992, abandoned, which is a continuation of Ser. No. 262,919, Oct. 26, 1988, abandoned.

[51] Int. Cl.⁵ .................................. C07C 2/02
[52] U.S. Cl. ........................... 585/532; 585/500; 585/520; 585/530
[58] Field of Search ............... 585/532, 520, 500, 530

[56] References Cited

U.S. PATENT DOCUMENTS

| | | | |
|---|---|---|---|
| 2,957,930 | 10/1960 | Jackson | 585/504 |
| 3,119,884 | 1/1964 | Allen et al. | 585/517 |
| 3,200,169 | 8/1965 | Nichols | 585/532 |
| 3,200,170 | 8/1965 | Nichols | 585/532 |
| 3,501,551 | 3/1970 | Heidler et al. | 585/517 |
| 3,639,661 | 2/1972 | Marek et al. | 526/118 |
| 3,985,822 | 10/1976 | Watson | 585/520 |
| 3,991,129 | 11/1976 | Daniels | 585/504 |
| 3,997,129 | 12/1976 | Ban et al. | 242/201 |
| 4,465,887 | 8/1984 | Schammel | 585/517 |
| 4,558,170 | 12/1985 | Chen et al. | 585/532 |

FOREIGN PATENT DOCUMENTS

| | | |
|---|---|---|
| 731006 | 9/1969 | Belgium . |
| 1195760 | 6/1970 | United Kingdom . |
| 1449840 | 9/1976 | United Kingdom . |

Primary Examiner—Patrick P. Garvin
Assistant Examiner—E. D. Irzinski
Attorney, Agent, or Firm—Harvey L. Cohen

[57] ABSTRACT

Poly-n-butene is prepared from a mixed $C_4$ hydrocarbon feedstream containing less than about 5 wt. % isobutylene using an $AlCl_3$-HCl catalyst system wherein the HCl is introduced separately into the feedstream to form organochloride in the feedstream. Polymer product having a very narrow molecular weight distribution is obtained over the $\overline{M}_n$ range of 300 to 900.

25 Claims, 1 Drawing Sheet

ALCL₃-CATALYZED PROCESS FOR PREPARING POLY-N-BUTENES FROM MIXED BUTENES

This is a continuation of application Ser. No. 823,120, filed Jan. 21, 1992 and now abandoned, which is a continuation of application Ser. No. 262,919, filed Oct. 26, 1988 and now abandoned.

CROSS-REFERENCE TO RELATED APPLICATIONS

This application is related to applications entitled, "Improved Organo-Al-Chloride Catalyzed Poly-n-butene Process", application Ser. No. 07/262,918, filed Oct. 26, 1988 and now U.S. Pat. No. 4,952,739, and "Improved Isobutylene Process", application Ser. No. 07/276,135, filed Nov. 25, 1988 and now U.S. Pat. No. 4,935,576.

BACKGROUND OF THE INVENTION

1. Field of the Invention

This invention relates to the polymerization of butenes and, more particularly, this invention relates to the production of poly-n-butenes from a mixed $C_4$ feedstream utilizing an aluminum chloride-hydrogen chloride co-catalyst system.

2. Description of the Prior Art

The production of isobutylene polymers from mixed $C_4$ hydrocarbon feedstreams is generally known in the art. It is also known to utilize $AlCl_3$ as the polymerization catalyst in such processes and the prior art discloses a number of co-catalyst or catalyst promoters, including hydrogen chloride for use under various conditions in isobutylene polymerization.

Representative disclosures include U.S. Pat. No. 2,957,930 which shows the use of 10 to 20% $AlCl_3$ catalyst in the production of polyisobutylene from a $C_1$ to $C_5$ petroleum gas feedstock with 0.08 to 0.12 percent HCl, relative to $AlCl_3$, used as a catalyst promoter. This reference notes that correspondingly small quantities of water vapor or chloroform, which can react with $AlCl_3$ to release HCl, may also be used. British Patent No. 1,195,760 (1970) discloses the production of olefin polymers by polymerization in the presence of the catalyst comprising a liquid complex of $AlCl_3$, HCl and an alkyl benzene. Polymerization products include materials other than polyisobutylene and products with a narrow molecular weight distribution are disclosed in this reference.

U.S. Pat. Nos. 3,200,169 and 3,200,170 deal with the reaction mixture separation methods after polymerization of propylene or butylene feeds utilizing an ammonia treatment process. HCl is disclosed in the references as a suitable catalyst promoter added to the reaction zone which contains an $AlCl_3$ catalyst.

U.S. Pat. No. 3,997,129 discloses polybutylenes from a $C_1$ to $C_5$ liquefied refinery stream wherein the catalyst is solid particles of $AlCl_3$ promoted with HCl gas or its equivalent. This process employs a static mixer for mixing catalysts and feed prior to conducting polymerization.

U.S. Pat. No. 3,985,822 relates to the production of poly-n-butenes by use of $AlCl_3$ promoted with HCl but the objective is to reduce the isobutylene content of the polymer product.

U.S. Pat. No. 3,119,884 discloses a series of vertical column reactors useful for polymerizing isobutylene and further discloses a catalyst comprising $AlCl_3$ and HCl or a substance which generates HCl. The catalyst system is described as an acid promoted $AlCl_3$ catalyst. In such a system, a reaction between HCl and $AlCl_3$ occurs to form $H^+AlCl_4^-$ which is the species that initiates polymerization. According to this process, one method of introducing catalysts and reactants is to have the three materials, i.e., $AlCl_3$, HCl and liquid feed, enter the reactor through the same duct. This necessarily results in polymerization beginning in the duct line in an exothermic reaction and the reaction is not controlled by the refrigeration system of the reactor. Any product formed under these conditions will have an undesirable low molecular weight and broad molecular weight distribution.

U.S. Pat. No. 3,501,551 is directed to a process for producing normal butene polymers at molecular weights of from about 200–750 wherein a $C_{3-5}$ hydrocarbon mixture containing isobutylene and normal butylenes as substantially the only olefins present are reacted in liquid phase with an aluminum chloride catalyst to form a reaction mixture containing only isobutylene polymers. The isobutylene polymers are separated and thereafter the resulting reaction mixture is treated with a Friedel-Crafts catalyst to form a second reaction mixture containing normal butylene polymers. The aluminum chloride in the first polymerization section is indicated to be added alone or in combination with promoters, such as alkyl chloride, e.g., isopropyl chloride.

U.S. Pat. No. 3,639,661 relates to processes for polymerization of isobutylene employing as polymerization catalysts either a reaction product of titanium tetrafluoride with a chlorine bearing Friedel-Crafts catalyst which is soluble in isobutylene or a reaction product of titanium tetrachloride or boron trichloride with a fluorine bearing compound whose fluorine atoms are capable of partly replacing chlorine atoms in the titanium tetrachloride or boron tetrachloride. It is indicated that the catalyst can be made in situ by adding the catalyst components separately to the reaction medium.

U.S. Pat. No. 3,991,129 relates to the production of polybutene employing recycled reaction liquid, liquefied butenes and Friedel-Crafts catalyst, which is stated to be preferably aluminum chloride promoted with hydrochloric acid gas or its water equivalent. The catalyst is admixed with the recycle and fresh feed lines upstream of a static mixer prior to charging to the polymerization reaction column.

U.S. Pat. No. 4,465,887 relates to a process for producing butylene polymers having molecular weights of from about 400–5,000 wherein the feedstream containing mixed butenes is fractionated to remove recited amounts of cis-2-butene. The overhead fraction from the fractionating step contains isobutylene and is reacted in the presence of an aluminum chloride catalyst to polymerize the isobutylene and to form a reaction mixture consisting of isobutylene polymers and unreaction hydrocarbons including normal butenes. This reaction mixture is flashed distilled or recover the isobutylene polymers and the unreacted hydrocarbon mixture is then reacted in a presence of a catalyst system consisting of aluminum chloride and a promoter to polymerize butylenes in the fraction and form in a second reaction product mixture containing butylene polymers having lower molecule weights, e.g., of from 400–900 molecular weight. The patent indicates that a promoter is essential of a second polymerization reaction, and indicates that typical promoters are isopropyl chloride, t-butyl chloride, water and hydrogen chloride. The patent's promoters are added to the reactor separately from the aluminum chloride and the first hydrocarbon reaction mixture containing the unreacted normal butene.

U. S. Patent 4,558,170 relates to the preparation of polyisobutylene from a mixed $C_4$ hydrocarbon feedstream containing at least about 6 wt % isobutylene using an $AlCl_3$ - HCl catalyst system wherein the HCl is introduced separately into the feedstream to form organochlorides therein prior to introduction into the polymerization reactor.

U.K. Patent No. 1,449,840 describes a process for alkylating benzene, wherein benzene is contacted with a polybutene in the presence of aluminum chloride. The polybutene itself is prepared by polymerizing a mixed $C_4$ feedstock containing from 2-20 wt. % of isobutene. The polybutenes are stated to be prepared by conventional polymerization process using a Friedel-Crafts catalyst such as aluminum chloride.

Belgium Patent No. 731,006 relates to the alkylation of aromatic hydrocarbons using n-butene polymers, wherein the polymers are produced from a refiner stream containing n-butene basically free from isobutylene which are polymerized in the presence of aluminum chloride.

European Patent No. 115,635 relates to a continuous process for producing polyisobutylene from isobutylene feeds, wherein solvents and monomer vaporized during the polymerization are recycled after liquefaction to the polymerization zone.

SUMMARY OF THE PRESENT INVENTION

The present invention provides a further improvement in the process disclosed in U.S. Pat. No. 4,558,170, by virtue of permitting advantageous production of poly-n-butenes from the spent $C_4$ olefin containing stream produced as by-product in the process of forming polyisobutylene.

The present invention is considered distinguished from the remaining foregoing references in that it produces poly-n-butenes which are especially suitable as the oil soluble hydrocarbon component of a lubricating oil detergent. Poly-n-butenes produced in this invention are characterized by a narrow molecular weight distribution in the detergent molecular weight range, that is, a number average molecular weight ($\overline{M}n$) of about 300 to 900. Molecular weight distribution is used here in its normal sense as a measure of the breadth of molecular weight distribution and is defined as the ratio of $\overline{M}_w$ (weight average molecular weight) to $\overline{M}_n$. This narrow molecular weight distribution results in a product having a relatively lower viscosity than polyisobutylenes produced in heretofore conventional processes in the same molecular weight range. The process is especially characterized in the technique of addition of HCl cocatalyst to the feedstream prior to the feedstream entering the reactor. Other methods of providing HCl which the prior art considers suitable, i.e., such as adding HCl to the reactor itself, adding water or other HCl-generating reagents or adding HCl to $AlCl_3$ prior to initiation of polymerization are not suitable in this invention and do not provide the degree of process control and product quality achieved herein.

DETAILED DESCRIPTION OF THE INVENTION

Figure 1:
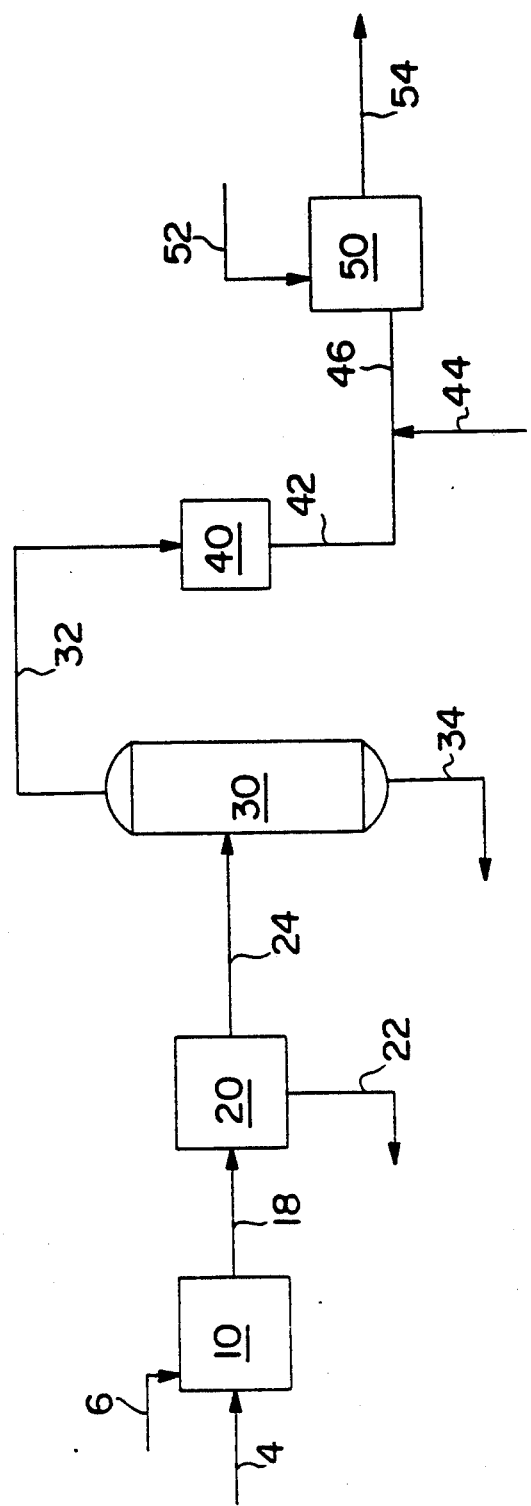
FIG. 1 is a diagrammatic illustration of one embodiment of the process of the present invention which is integrated with a process for producing polyisobutylene whereby the spent $C_4$ stream from the polyisobutylene process units is advantageously converted into the improved poly-n-butene polymers of the present invention.

In accordance with the present invention there has been discovered a process for preparing low molecular weight poly-n-butene having an $\overline{M}n$ in the range of about 300 to about 900, and preferably from about 400 to 800, and a molecular weight distribution less than about 1.4 (and preferably from about 1.2 to 1.4) from a feedstream mixture of $C_4$ hydrocarbons containing less than about 5% by weight isobutylene and containing at least about 12 wt. % normal-butenes in a stirred reaction zone maintained at a temperature of about 10° C. to 80° C., which comprises: ( a ) injecting HCl in an amount of from about 0.01 to 0.6 parts by weight per 100 parts by weight of the feedstream mixture into the feedstream mixture, in the substantial absence of the $AlCl_3$ and under conditions sufficient to substantially completely react the injected HCl with normal -butenes, thereby producing a treated feedstream mixture which contains not greater than about 1.0 ppm free HCl; (b) simultaneously introducing the treated feedstream mixture and the $AlCl_3$ catalyst as separate streams into the reaction zone; (c) contacting the introduced treated feedstream mixture and the introduced catalyst in the reaction zone for a time and under conditions sufficient to form a polymerization reaction mixture containing the poly-n-butene; (d) withdrawing the polymerization reaction mixture from the reaction zone; and (e) recovering the poly-n-butene product from said withdrawn polymerization reaction mixture. The poly-n-butenes can be recovered from the reaction mixture by quenching the withdrawn reaction mixture with aqueous alkali and separating therefrom poly-n-butenes product, which can then be stripped of unreacted $C_4$ hydrocarbons and poly-n-butenes below $\overline{M}n$ of about 200.

The feedstock for the process of this invention comprises a mixture of pressure liquefied $C_4$ hydrocarbons which comprise less than about 5% (preferably less than about 4.9 wt %, e.g. from about 0.1 to 4.9 wt % ) isobutylene, and at least about 12 wt. % (preferably at least about 15 wt %, e.g. from about 15 to 85 wt %) total normal-butenes (i.e., butene-1, cis- and trans-butene-2), together with n-butane, isobutane and less than about 1% (preferably less than about 0.8 wt % , e . g. from about 0 to 0.8 wt %) butadiene. The $C_4$ feedstream preferably is substantially free of $H_2$ and sulfur contaminants (e.g., mercaptans), e.g. <20 wppm $H_2$ and <5 wppm S. Such low levels of free $H_2$ minimize the degree of saturation in the poly-n-butene products of this invention, and the low S levels are desired to avoid undesired side-reactions with the monomer, polymer and catalyst components, and to avoid the need to resort to added expense and technical difficulties in removing the sulfur contaminants from the polymers thereby formed. Further, the $C_4$ feedstream is preferably substantially anhydrous, that it, contains less than about 0.05 wt % water, more preferably less than about 500 wppm water, based on the $C_4$ monomers in the feedstream. It has been found that water, which can be typically present in spent $C_4$ streams produced in the manufacture of polyisobutylene (as will be more completely described below) is not an effective co-catalyst in the manufacture of the poly-n-butene polymers of the present invention employing the $AlCl_3/HCl$ pre-reacted cocatalyst systems in the present invention. Rather, such excess water are undesired due to side-reactions of the water with the $AlCl_3$ which decrease the effective catalyst concentration in the reactor, and which do not offer any offsetting enhancement in the rate of polymerization or in any observed polymer performance property.

The preferred $C_4$ feedstream comprises spent $C_4$ streams produced as by-product in the manufacture of polyisobutylene and contains (by weight) less than about 5% isobutylene, about 10–70% saturated butanes and about 15–85% 1- and 2-butenes. The $C_4$ products other than butenes (e.g., saturated $C_4$ hydrocarbons), function as diluent or solvent in the reaction mixture and are a non-critical aspect of this invention. The isobutylene content of the feedstock should not be greater than about 5 wt. % of the feedstream. The $C_4$ feedstream is maintained at a sufficient pressure to be in liquid form both in the reactor inlet and in the reaction mixture itself at the reaction temperature of about 10° C. to 90° C., conventional cooling means (e.g., providing cooling coils within the reactor; cooling the external surfaces of the reactor; withdrawing a portion of the reaction mixture from the reaction zone to an external cooler and recycling it to the reaction zone; etc.) being used to maintain the reaction at these temperatures in view of the exothermic nature of the reaction. Preferred reaction temperatures are about 15° C. to 70° C, and most preferred 20° C. to 60° C. Generally, relatively higher temperatures tend to produce relatively low molecular weight polymer. Reaction pressures are generally from about 400 to 1000 kPa, and more typically from about 500 to 800 kPa.

The process of the present invention employs a tubular reactor or a stirred reactor (preferably a continuous type stirred reactor) having two separate inlet means for introduction of treated feedstream mixture and aluminum chloride catalyst, the latter being preferably added either (a) in the form of a slurry in a solvent or diluent to be used in the polymerization reaction (preferably a saturated hydrocarbon diluent, such as n-butane, isobutane or mixtures of saturated butanes), the slurry containing about 0.05 to 0.5 wt. % $AlCl_3$ or (b) in the form of a dry powder $AlCl_3$, such as finely divided $AlCl_3$ particles of about 50 to 100 mesh (U.S.S.).

The feedstream inlet means (e.g., a conduit) is fitted with a device for injection (preferably for continuous injection) of HCl (preferably gaseous HCl) co-catalyst into the $C_4$ feedstream at a point prior to reactor entry. The HCl injection point should be introduced into the $C_4$ feedstream sufficiently in advance of the reactor entry to permit substantially complete reaction of the HCl in the feedstream with 1- and 2-butenes prior to the polymerization reaction zone. The HCl is believed to react with the 1- and 2-butenes to form a 2-chlorobutane in the resulting treated feedstream mixture. Other organo chlorides can also be formed, principally t-butyl chloride from reaction with the isobutylene content of the monomer feedstream. The concentration of free HCl in the treated feedstream mixture at the point of reactor entry should therefore be not greater than about 1.0 ppm (parts per million) or less in order to achieve the advantage of the invention. The concentration of the HCl can be determined by conventional means, for example by analyzing the feedstream for organic chlorides and free HCl using a gas chromatograph equipped with a Hall detector. The rate of mixing (and, hence, reaction) of the monomers and the HCl can be conveniently enhanced by use of an in-line static (kinetic) mixer in the feedstream conduit downstream of the HCl injection point. To further enhance the rate of mixing of the HCl and monomers, the mixture of the HCl and the $C_4$ feedstream is preferably maintained at a temperature of from at least about 10° C., e.g., from about 10 to 100° C.

Preferably, the $AlCl_3$ catalyst is not admixed with the $C_4$ feedstream prior to, or during, the injection of the HCl (and preferably is not admixed with the $C_4$ monomer containing stream prior to the charging of the treated feedstream mixture into the reactor); otherwise uncontrolled, exothermic polymerization will be initiated unless extreme measures are taken (such as maintaining the admixture at a temperature below that which polymerization proceeds. Of course, the extent of such undesired pre-polymerization will vary, depending on the residence time of the admixture outside of the reactor's reaction zone.

Therefore, the treated feedstream mixture, containing the $C_4$ monomers and the pre-reacted HCl is preferably added (preferably continuously) to the reactor with $AlCl_3$ catalyst being introduced into the reaction mixture through a separate inlet.

The process of this invention can be practiced in a batchwise, semi-continuous or (as is preferred) in a continuous manner. Preferably, the treated feedstream mixture, containing the $C_4$ monomers and the pre-reacted HCl, and the $AlCl_3$ catalyst streams are added to the reaction zone substantially simultaneously, at a rate sufficient to maintain the selected ratio of the monomers and $AlCl_3$ in the liquid reaction mixture. However, it is also possible to add these streams in a stagewise manner to a liquid reaction mixture.

Polymerization occurs in an exothermic reaction in the reaction zone by contacting the two incoming streams in a cooled reactor with reactor temperature, preferably maintained at about 10° C. to 80° C. For a continuous-type stirred reactor, average reactant residence time will generally be about 10 to 45 minutes. There will generally be employed from about 0.1 to 2.0 wt. % of aluminum chloride catalyst per part by weight of treated feedstream mixture and from about 0.01 to 0.6 wt. % of HCl co-catalyst per parts by weight of this treated feedstream mixture, with the preferred range being from about 0.02 to 0.5 wt. % HCl. Generally, the aluminum chloride catalyst and HCl-cocatalyst will be employed in a ratio of from about 0.5 to 5 parts, preferably from about 1 to 3 parts, more preferably from about 1 to 2 parts, of the aluminum chloride catalyst per part of the HCl-cocatalyst (calculated as HCl).

The poly-n-butenes prepared in accordance with this invention generally contain an average of about 1 double bond per polymer chain and up to about 10 percent of the polymer chains may be saturated.

The poly-n-butenes prepared in accordance with this invention offers a number of advantages over poly-n-butenes prepared by prior art techniques with respect to those properties which are important for its use in making lubricating oil additives, typically in a form of detergents.

The significant aspect is that the process of this invention permits a more precise control of poly-n-butenes production than heretofore possible.

In the process of the present invention, a high degree of reactor controllability is achieved and the target specification of molecular weight and molecular weight distribution which is desired can be met through monitoring and adjustment of incoming catalyst addition rate, such as the HCl addition rate relative to normal butene content, reactor temperature, residence time, feedstream introduction rate and the like. These parameters and the quality of the finished product can be monitored at close time intervals in the practice of the present invention. Thus, for a given poly-n-butene molecular weight desired, process conditions can be defined which will direct the process toward the target product.

The process of this invention also provides a number of product quality improvements in the poly-n-butenes product which are carried over to the quality of the detergent additive ultimately produced.

Another advantage of the invention is a significant reduction in the quantity of so called "light ends" in the polymer product. These are poly-n-butenes in the undesirable $\overline{M}n$ range of about 110 to 200. The process of this invention minimizes the quantity of these materials and the yield of desired product in the high molecular weight range increases accordingly. Products of this invention will generally contain less than about 10% by weight of such low molecular weight polybutenes in the reaction mixture prior to product finishing. After stripping of volatiles and light ends of $\overline{M}n$ 200 and below, the finished product polymer will preferably contain less than about 5% by weight of polybutenes having an $\overline{M}n$ below 250. The exact amount of acceptable low molecular weight polybutenes will vary depending on product viscosity and the intended end-use of the polymer product. For use in the preparation of lubricating oil metal detergents (to be described more completely below), the poly-n-butene polymer produced by the present invention will be characterized by a number average molecular weight of from about 340 to 800 and by a molecular weight distribution of from about 1.1 to 1.3.

The technique of addition of HCl to the feedstream in the absence of AlCl$_3$ to form a pre-reacted feedstream offers the further advantage of substantially reducing the presence of chlorinated polybutenes in the finished product. Any polymerization process which permits free HCl to exist in the reactor has the problem of corrosion and the present invention successfully avoids it through use of the pre-reacted feedstream.

In the present invention, HCl injected into the feedstream reacts quickly with normal-butylene to produce 2-chlorobutane which, upon entering the reactor, functions as a co-catalyst with AlCl$_3$ to initiate the polymerization, the AlCl$_3$ reacting with the 2-chlorobutane to form AlCl$_4^-$ and a butyl cation and thereby initiating polymerization. In contrast to this, when HCl is used to promote AlCl$_3$, the species H+AlCl$^-_4$ which is formed by reaction between HCl and AlCl$_3$ initiates the polymerization. Polymerization in accordance with the catalyst species of the present invention is more efficient and provides a degree of process control and product quality not obtainable with prior art procedures based upon the use of AlCl$_3$.

BRIEF DESCRIPTION OF THE DRAWING

FIG. 1 represents one embodiment of the present invention.

DETAILED DESCRIPTION OF THE DRAWING

Referring to FIG. 1, wherein one embodiment of the process of the present invention is illustrated, a Referring to FIG. 1, wherein one embodiment of liquid monomer feed 4 comprising 1-butene, 2-butene, isobutylene, and saturates (butanes), and generally containing at least about 6 wt % (e.g., from about 10 to 50 wt %) isobutylene, and a polymerization catalyst 6 are introduced into first polymerization reaction zone 10 wherein the isobutylene monomer is selectively polymerizaed to form a polyisobutylene (PIB) polymer mixture 18 containing PIB and unreacted monomers. Mixture 18 is passed to catalyst removal zone 20 wherein the polymerization catalyst 22 is separated from the remaining components of the polymerization mixture. The resulting liquid PIB/monomer mixture 24 is passed to a polymer recovery zone 30 for separation of monomer stream 32 from liquid PIB stream 34. Typically, monomer stream 24 is removed from zone 30 as a gas. Stream 32 comprises a crude spent C$_4$ stream and comprises 1-butene, 2-butene, unreacted isobutylene, and butanes, and also contains water, typically in amounts of from about 50 to 600 wppm, more typically from about 200 to 500 wppm, e.g. due to the use in zone 20 of an aqueous caustic catalyst quench/water wash step, or from the use in polymerization zone 10 of water as a co-catalyst in the formation of the PIB polymer.

The crude spent monomer stream 32 is then passed to drying zone 40 wherein water is removed, to provide a C$_4$ monomer feedstream 42 containing less than about 0.05 wt %, preferably less than about 500 wppm, water (e.g., 10 to 100 wppm, more preferably from about 10 to 50 wppm water). The C$_4$ monomer feedstream 42 is then contacted with HCl in a portion 46 of conduit 42 to form the treated feedstream mixture containing not greater than about 1 wppm free HCl which is then charged to polymerization reaction zone 50, along with a separately charged AlCl$_3$ catalyst stream 52, for polymerization as described above to form the poly-n-butene polymers of this invention. The resulting poly-n-butene polymerization reaction mixture 54 can be withdrawn from zone 50 and treated as described above for recovery of the polymer product, including the steps of catalyst removal and stripping to remove low molecular weight polymer fractions, as desired.

The catalysts and polymerization conditions, and the methods of catalyst separation and polymer recovery, employed in zones 10, 20 and 30, respectively, are conventional. Exemplary catalysts for PIB polymerization are AlCl$_3$, HF, BF$_3$, AlBr$_3$, and organo-aluminum chlorides, which can be employed together with co-catalysts or promoters such as alkanols (e.g., methanol, ethanol, propanol, isopropanol, butanol, tert-butanol and the like), phenol, and C$_1$ to C$_4$ alkyl esters of such hydroxy compounds, and preformed complexes of any of these catalysts and co-catalysts (e.g., AlCl$_3$-ethanol complexes, HF-ethanol complexes, and the like). Especially preferred catalysts are AlCl$_3$, BF$_3$ and organo-Al chlorides of the formula (R)$_x$Al(Cl)$_{3-x}$ wherein R is C$_1$ to C$_4$ alkyl and x is 1 or 2. The temperature in the first polymerization reaction 10 will generally from about −10° to +10° C.

The drying of the crude spent C$_4$ monomer stream in zone 40 can be accomplished by contacting the stream with a dessicant which is substantially nonreactive with any organic component of the stream, such as CaCl$_2$, CaSO$_4$, molecular sieves (e.g., mol sieves 3A, 13X from Linden, Union Carbide), and the like. Drying zone 40 can comprise one or more vessels containing a solid dessicant through which stream 32 is passed, and usefully can comprise a series of separate vessels arranged in parallel to fascilitate the charging to any vessel of fresh dessicant in the continuous practice of the process of this invention.

Poly-n-butylenes prepared in accordance with this invention are particularly useful as a feedstock for the production of improved lubricating oil detergents. Such detergents include the metal salts of alkyaryl sulphonic acids, alkyl phenols, sulphurized alkyl phenols, alkyl salicylates, alkyl naphthenates, and other oil soluble mono- and di-carboxylic acids, wherein the detergent contains at least one alkyl group comprising a polymer corresponding to the poly-n-butene polymer produced in the process of this invention. Usually these metal containing detergents are used in lubricating oil in amounts of about 0.01 to 10, e.g. 0.1 to 5 wt. %, based on the weight of the total lubricating composition. Marine diesel lubricating oils typically employ such metal-containing detergents (which are also sometimes termed "metal rust inhibitors") in amounts of up to about 20 wt.%.

Preferred detergent materials comprise oil-soluble metal salts of hydrocarbon sulfonic acids wherein the sulfonic acids are prepared from aromatic hydrocarbons, which has been alkylated with the polymers of this invention. The aromatic hydrocarbons from which the alkyl substituted aromatic hydrocarbons can be derived include benzene, toluene, xylene, naphthalene, diphenyl and the halogen derivatives such as chlorobenzene, chlorotoluene and chloronaphthalene. The alkylated aromatic compounds can then be sulfonated and converted to the metal salt in the usual manner. If desired, these alkyl-substituted aromatic hydrocarbons, containing alkyl-groups derived from the polybutenes of this invention, can be admixed with other alkyl-substituted aromatic hydrocarbons such that the sulfonation step is performed upon a mixture of such alkyl-substituted aromatic hydrocarbons. Such other conventional alkyl-substituted aromatic hydrocarbons include those obtained from the fractionation of petroleum by distillation and/or extraction.

The precise manner in which the alkylation reaction is carried out is not critical, and any conventional alkylation process can be employed. The following discussion will illustrate the alkylation employing benzene as the aromatic hydrocarbon, although it will be understood that any convenient aromatic hydrocarbon can also be employed.

Alkylation is generally carried out in the presence of a Friedel-Crafts type catalyst at temperatures in the range of from about −10° to 75° C., e.g., at 5° C., for times of from 5 to 60 minutes, e.g., 10 to 20 minutes. Suitable catalysts include, for example, $AlCl_3$, HF, $BF_3$ and $AlBr_3$, polyphosphoric acid, $H_2SO_4$, and aluminum chloride hydrocarbon complexes. Aluminum chloride is the preferred catalyst, which may be either fresh $AlCl_3$ or spent $AlCl_3$ sludge from a previous alkylation step, fortified by the addition of from 5 to 20 wt % fresh $AlCl_3$.

It is generally desirable to maintain in the reaction mixture a volume ratio of benzene to polymer of at least 3:1, e.g. 5:1, although ratios of up to 20:1 may be used.

Although temperatures during the alkylation with $AlCl_3$ can range as high as 60° C., it is preferred to use temperatures of between about −5° to 30° C. Weight ratios of polymer to catalyst will be in the range of about 30:1 to 7:1. Additionally, in the case of $AlCl_3$, an activator such as HCl can be added in an amount of from 15 to 40 wt %, based on the $AlCl_3$.

If a liquid HF catalyst is used for alkylation, it is preferred to use an HF-to-hydrocarbon reactants volume ratio of 0.1:1 to 1.0:1, and temperatures in the range of from 0° to 20° C. The concentration of this catalyst can range from 85 to 100 wt % HF, its water content being maintained very low, e.g. no higher than 1 or 2 wt %, the remainder being dissolved hydrocarbon material.

The alkylated fraction is recovered from the alkylation reaction mass and is sulfonated in a known manner, e.g. by contact with an excess of concentrated sulfuric acid, oleum, $ClSO_3H$, sulfur trioxide, etc. The sulfonation can be carried out at temperatures up to about 60° C. Acid up to about 100 wt % concentration can be employed, and preferably oleum containing up to e.g., 20 wt % or more $SO_3$. With higher acid concentration, lower reaction times are required, e.g. about 3 to 4 hours with 98 wt % acid, about 2 hours with 100 wt % acid, and preferably from about 0.5 to 1.0 hour with oleum. Volume ratios of sulfuric acid to hydrocarbon can range from 0.8:1 to 1.25:1, with a 1:1 ratio being suitable.

The sulfonated product can be recovered as described in U.S. Pat. No. 3,367,865, the disclosure of which is hereby incorporated in its entirety.

The alkali and alkaline earth metal salts (e.g., the Ca, Mg, Ba, Na, K, Li, etc. salts) of the sulfonated aromatic materials thereby producted can be prepared in a known manner using conventional techniques, such as are described in U.S. Pat. No. 3,367,865. Highly basic alkaline earth metal sulfonates are usually produced by heating a mixture comprising an oil-soluble alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

Preferred alkaline earth sulfonate additives are calcium and magnesium alkyl aromatic sulfonate having a total base number ranging from about 200 to about 400 with the magnesium sulfonate content ranging from about 25 to about 32 wt. %, and the calcium sulfonate content ranging from about 20 to 40 wt %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$–$C_{26}$ alkyl salicylates and phenates (see U.S. Pat. No. 2,744,069) or polyvalent metal salts of alkyl salicyclic acids, said acids obtained from the alkylation of phenols (e.g., as described above) followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC-ArR^1-X_y(ArR^1OH)_n$$

where Ar is an aryl radical of 1 to 6 rings, $R^1$ is a poly-n-butene alkyl group, X is a sulfur (—S—) or methylene (—CH$_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula:

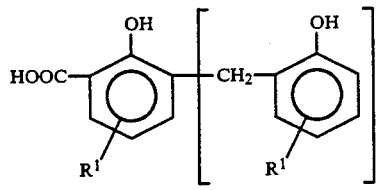

1-4 wherein $R^1$ is as defined above, with a TBN of 60 to 150 is highly useful in this invention.

The sulfurized metal phenates can be considered the "metal salt of a phenol sulfide" which thus refers to a metal salt whether neutral or basic, of a compound typified by the general formula:

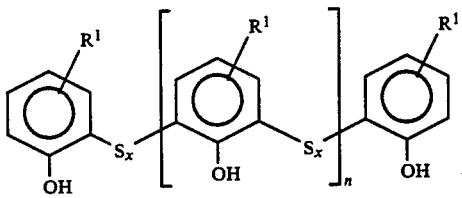

where x=1 or 2, n=0, 1 or 2; or a polymeric form of such a compound, where $R^1$ is as defined above, and n and x are each integers from 1 to 4. The metal salt is prepared by reacting an poly-n-butene substituted phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal poly-n-buteny substituted phenate, wherein the polybutyl group is derived from a poly-n-butene polymer of this invention having a number average molecular weight of from about 300 to 400, has a metal content up to and greater than 100% in excess of the metal present in the corresponding normal sulfurized metal phenates wherein the excess metal is produced in oil-soluble or dispersible form (as by reaction with $CO_2$).

Lubricating oil compositions will typically contain other additives in customary amounts to provide their normal attendant functions such as dispersants (e.g., ashless dispersants such as long chain hydrocarbyl substituted succinimides [e.g., polyisobutenyl succinimides]; long-chain hydrocarbyl Mannich Base dispersants [e.g., Mannich Base dispersants prepared by condensation of polyisobutylene-substituted phenol, formaldehyde and alkylene polyamines]; and long-chain hydrocarbyl-substituted amines [e.g., polyisobutylene-substituted alkylene polyamines]; and borated derivatives thereof), anti-wear additives (e.g., zinc dihydrocarbyl dithiophosphates), anti-oxidants (e.g., copper antioxidants and supplemental antioxidants as disclosed in European Patent 24,146), viscosity modifiers (e.g., ethylene-propylene copolymers, hydrogenated polyisoprene-styrene copolymers, hydrogenated polybutadiene-styrene copolymers, hydrogenated Poly(isoprene-butadiene-styrene) terpolymers, etc.) and the like.

Lubricating oil compositions will usually contain detergents in amounts of from about 0.01 to 20 wt. %, and have typically from 0.01 to 3 wt. %. Detergents are conveniently packaged and dispensed in the form of solution concentrates containing about 5 to 70 wt. %

(e.g., from about 20 to 60 wt. %) detergents in mineral oils.

The invention is further illustrated by the following examples (wherein part are by weight unless otherwise indicated) which are not to be considered as limitative of its scope.

EXAMPLES 1-4

In a series of runs, liquefied anhydrous feedstream composed of 1.8 wt. % isobutene and the selected quantity of 1-butene, 2-butene, n-butane and isobutane were mixed for pre-reaction with the selected amount of gaseous anhydrous HCl. Analysis showed less than 1 ppm HCl remained unreacted. The pre-reacted feed was introduced in liquefied form at the rate of 56 ml per minute into a continuous type stirred reactor maintained at the selected temperature by means of a water cooling bath. A slurry of 0.4 wt. % AlCl$_3$ was introduced into the reactor and continuously adjusted to maintain the desired molecular weight of polymer. Reaction product was withdrawn continuously at a rate corresponding to the rate of introduction of the feed and the molecular weight of the product was continuously evaluated. Average residence time was between 25 to 35 minutes. The polymer product was recovered, stripped with dry N$_2$ (at 150° C. to remove the light molecular weight fraction <200) and analyzed. The data thereby obtained are summarized in Table I below.

COMPARATIVE EXAMPLES 5-12

The procedure of Example 1 was repeated in a series of runs, except that no HCl was added and water, in the selected amount, was pre-mixed with the C$_4$ feed. The results thereby obtained are summarized in Table II below.

TABLE I

| | EXAMPLE NO. | | | |
|---|---|---|---|---|
| | 1 | 2 | 3 | 4 |
| Run Conditions | | | | |
| Residence Time (Min) | 30 | 30 | 30 | 30 |
| Avg Reactor Temp, °C. | 55.3 | 46.9 | 48.3 | 47.3 |
| Avg Bath Temp, °C (1) | 43.5 | 37.7 | 37.8 | 34.6 |
| Avg Delta T, °C. | 11.8 | 9.2 | 10.5 | 12.7 |
| Reactor Pressure, kPa | 200 | 200 | 230 | 200 |
| C$_4$ Feed Composition | | | | |
| Feed 1-Butene, % | 39.4% | 39.4% | 39.4% | 39.4% |
| Feed 2-Butenes, % | 25.1% | 25.1% | 25.1% | 25.1% |
| Feed Isobutylene, % | 1.8% | 1.8% | 1.8% | 1.8% |
| Feed n-Butane, % | 20.2% | 20.2% | 20.2% | 20.2% |
| Feed Isobutane, % | 13.5% | 13.5% | 13.5% | 13.5% |
| Product Before Stripping | | | | |
| Mn (2) | 560 | 510 | 530 | — |
| Mp (3) | — | — | — | — |
| MWD (4) | 1.51 | 1.27 | 1.33 | — |
| Viscosity, cSt, 100° C. | 11.95 | 8.63 | 11.26 | 7.92 |
| Product After Stripping | | | | |
| Mn (2) | 622 | 554 | 597 | 655 |
| Mp (3) | 706 | 618 | 706 | 731 |
| MWD (4) | 1.30 | 1.23 | 1.29 | 1.21 |
| Viscosity, cSt, 100° C. | 23.21 | 13.58 | 15.33 | 19.78 |
| Chlorine, Wt % (5) | 0.062% | — | — | 0.008% |
| Aluminum, ppm | — | — | — | 1.0% |
| Light Ends, Wt % (6) | 7.76% | 7.88% | 5.75% | 9.16% |
| Light Ends, Mn (7) | 254 | 259 | 260 | 252 |
| Catalyst | AlCl$_3$ | AlCl$_3$ | AlCl$_3$ | AlCl$_3$ |
| Cocatalyst | HCl | HCl | HCl | HCl |
| Catalyst/Cocatalyst Wt:Wt | 20.2 | 8.2 | 9.3 | 4.6 |
| Wt % Catalyst/Total C$_4$ Feed | 1.82% | 1.32% | 1.58% | 1.43% |
| Wt % Cocat/Total C$_4$ Feed | 0.09% | 0.16% | 0.17% | 0.31% |
| Residual 1-Butene, % (8) | 11.0% | 14.0% | 5.8% | 14.6% |
| Residual 2-Butenes, % (8) | 15.9% | 19.6% | 10.2% | 19.7% |
| 1-C$_4$ = Conversion, % (9) | 87.2% | 81.6% | 93.8% | 80.0% |
| 2-C$_4$ = Conversion, % (9) | 70.9% | 59.6% | 82.8% | 57.7% |

Notes:
(1) Temperature of cooling bath.
(2) Number average molecular weight determined by gel permeation chromatography (GPC).
(3) Peak molecular weight. Determined by GPC.
(4) Molecular weight distribution.
(5) Residual Cl in polybutenes product.
(6) Weight (based on total product before stripping) of light products removed by stripping.
(7) Number average molecular weight. Determined by GPC.
(8) Determined by on-line GC.
(9) Calculated.

TABLE II

| | EXAMPLE NO. | | | | | | | |
|---|---|---|---|---|---|---|---|---|
| | 5 | 6 | 7 | 8 | 9 | 10 | 11 | 12 |
| Run Conditions | | | | | | | | |
| Residence Time (Min) | 30 | 30 | 30 | 30 | 30 | 30 | 30 | 30 |
| Avg. Reactor Temp, °C. | 29.5 | 30.3 | 27.8 | 28.3 | 26.9 | 10.1 | 28.3 | 28.3 |
| Avg. Bath Temp, °C (1) | 23.1 | 23.2 | 23.1 | 23.1 | 23.2 | 6.2 | 23.1 | 23.1 |
| Avg Delta T, °C. | 6.4 | 7.1 | 4.7 | 5.2 | 3.7 | 3.9 | 5.2 | 5.2 |
| Reactor Pressure, kPa | 300 | 300 | 300 | 250 | 250 | 250 | 250 | 250 |

TABLE II-continued

| | EXAMPLE NO. | | | | | | | |
|---|---|---|---|---|---|---|---|---|
| | 5 | 6 | 7 | 8 | 9 | 10 | 11 | 12 |
| $C_4$ Feed Composition | | | | | | | | |
| Feed 1-Butene, % | 39.4% | 39.4% | 39.4% | 39.4% | 41.4% | 39.4% | 41.4% | 41.4% |
| Feed 2-Butenes, % | 25.1% | 25.1% | 25.1% | 25.1% | 19.6% | 25.1% | 19.6% | 19.6% |
| Feed Isobutylene, % | 1.8% | 1.8% | 1.8% | 1.8% | 1.8% | 1.8% | 1.8% | 1.8% |
| Feed n-Butane, % | 20.2% | 20.2% | 20.2% | 20.2% | 16.5% | 20.2% | 16.5% | 16.5% |
| Feed Isobutane, % | 13.5% | 13.5% | 13.5% | 13.5% | 20.7% | 13.5% | 20.7% | 20.7% |
| Product Before Stripping | | | | | | | | |
| Mn (2) | 478 | 497 | 495 | 506 | 647 | 505 | 652 | 640 |
| Mp (3) | 660 | 660 | 660 | 660 | — | — | — | — |
| MWD (4) | 1.33 | 1.32 | 1.29 | 1.32 | 1.34 | 1.30 | 1.32 | 1.32 |
| Viscosity, cSt, 100° C. | 8.39 | 9.14 | 8.84 | — | 15.99 | — | 20.56 | 15.53 |
| Product After Stripping | | | | | | | | |
| Mn (2) | 592 | 605 | 599 | 566 | 712 | 527 | 716 | 715 |
| Mp (3) | 639 | 639 | 639 | 639 | 839 | 660 | 839 | 899 |
| MWD (4) | 1.20 | 1.19 | 1.20 | 1.26 | 1.25 | 1.28 | 1.27 | 1.30 |
| Viscosity, cSt, 100° C. | 16.26 | 16.54 | 17.76 | 16.69 | 31.02 | 15.00 | 26.70 | 24.84 |
| Chlorine, Wt % (5) | 0.272% | — | — | — | 0.004% | — | — | — |
| Aluminum, ppm | 2.4 | — | — | — | — | — | — | — |
| Light Ends, Wt % (6) | 15.91% | 14.87% | 17.77% | 11.69% | 5.00% | 3.83% | 3.87% | 4.65% |
| Light Ends, Mn (7) | 259 | 248 | 265 | 264 | 264 | — | 273 | 261 |
| Catalyst | $AlCl_3$ | $AlCl_3$ | $AlCl_3$ | $AlCl_3$ | $AlCl_3$ | $AlCl_3$ | $AlCl_3$ | $AlCl_3$ |
| Cocatalyst | Water | Water | Water | Water | Water | Water | Water | Water |
| Catalyst/Cocatalyst Wt:Wt | 48.5 | 74.5 | 74.5 | 58.5 | 41.0 | 17.5 | 42.2 | 42.2 |
| Wt % Catalyst/Total $C_4$ | 1.95% | 2.98% | 2.98% | 2.34% | 2.46% | 0.70% | 2.53% | 2.53% |
| Wt % Cocat/Total $C_4$ | 0.04% | 0.04% | 0.04% | 0.04% | 0.06% | 0.04% | 0.06% | 0.06% |
| Wt % Water/Total $C_4$ | 0.04% | 0.04% | 0.04% | 0.04% | 0.06% | 0.04% | 0.06% | 0.06% |
| Residual 1-Butene, % (8) | 15.0% | 14.1% | 22.8% | 9.1% | 12.9% | 15.0% | 7.9% | 6.8% |
| Residual 2-Butenes, % (8) | 23.5% | 21.9% | 25.2% | 20.1% | 16.5% | 24.3% | 14.7% | 13.8% |
| 1-$C_4$ = Conversion, % (9) | 79.8% | 82.3% | 62.5% | 89.2% | 83.0% | 82.1% | 90.4% | 91.9% |
| 2-$C_4$ = Conversion, % (9) | 50.3% | 56.7% | 35.0% | 62.7% | 54.1% | 54.5% | 62.2% | 65.1% |

NOTES
(1) Temperature of cooling bath.
(2) Number average molecular weight determined by gel permeation chromatography (GPC).
(3) Peak molecular weight. Determined by GPC.
(4) Molecular weight distribution.
(5) Residual Cl in polybutenes product.
(6) Weight (based on total product before stripping) of light products removed by stripping.
(7) Number average molecular weight. Determined by GPC.
(8) Determined by on-line GC.
(9) Calculated.

From the foregoing Examples 1-4 and Comparative Examples 5-10, it can be seen that the pre-reacted HCl/$C_4$ feed permitted the use of higher polymerization reactor temperatures (35 to 44° C. bath temperature) as compared to the lower reactor temperatures (6 to 23° C) with a premixed water co-catalyst to achieve poly-n-butenes with about the same $\overline{M}n$. This higher reactor temperature advantageously permits the use of a water cooling system, as opposed to a more costly liquid ammonia or liquid propane cooling system, for cooling of the polymerization reactor.

Further, the above data indicate that $AlCl_3$ catalyst efficiencies are surprisingly greater with a pre-reacted HCl/$C_4$ feed of this invention (1.3 to 1.8 wt. % $AlCl_3$), as compared to a pre-mixed water cocatalyst (2 to 3 wt.% $AlCl_3$) at the desired higher reactor temperatures. A higher $AlCl_3$ catalyst efficiency (0.70 wt. %) was observed in Comparative Example 10 at the expense of decreasing the polymerization reactor temperature to about 6° C. The desired poly-n-butene product was formed at a lower catalyst/co-catalyst ratio in Examples 1-4 (4.6 to 20.2:1) as compared to the catalyst/cocatalyst ratios required in the Comparative Examples (17.5 to 74.5:1).

The pre-reacted HCl co-catalyst/$C_4$ feed of this invention also resulted in surprisingly consistently high butene-1 and butene-2 conversions (80 to 94% butene-1 conversion and 58-83% butene-2 conversion) over a range of reactor conditions, whereas changes in the water-cocatalyzed polymerization reactor conditions resulted in a greater variability in such conversions (62 to 92% butene-1 conversion and 35 to 65% butane-2 conversion). The pre-reacted HCl co-catalyst of this invention exhibited the ability to form poly-n-butene with up to about 83% butene-2 conversion, whereas a butene-2 conversion higher than 65% was not achieved with the water co-catalyst.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for preparing low molecular weight poly-n-butene having an $M_n$ in the range of about 300 to about 900, having a molecular weight distribution less than about 1.4, and having less than about 10% by weight of light-end polymer of number average molecular weight less than or equal to about 250, said process comprising:
   (a) providing a monomer feedstream comprising from 10 to 50 wt. % isobutylene; 1-butene; and 2-butene;
   (b) selectively polymerizing the isobutylene to form a composition comprising polyisobutylene and unreacted monomers;

(c) separating the unreacted monomers from the polyisobutylene as an unreacted monomer feedstream, the unreacted monomer feedstream comprising less than 5% by weight isobutylene and at least about 12% by weight normal-butenes;

(d) injecting into the unreacted monomer feedstream derived in accordance with step (c), an amount of HCl of from about 0.01 to 0.6 parts by weight per 100 parts by weight of said unreacted monomer feedstream, in the substantial absence of aluminum trichloride catalyst and under conditions sufficient to substantially completely react the injected HCl and thereby form 2-chlorobutane cocatalyst, thereby producing a treated unreacted monomer feedstream which contains less than 1.0 ppm free HCl;

(e) simultaneously introducing the treated unreacted monomer feedstream mixture and aluminum trichloride chloride catalyst as separate streams into a reaction zone;

(f) contacting the introduced treated unreacted monomer feedstream mixture and the introduced catalyst in the reaction zone at from 10° C. to 90° C., for a time and under conditions sufficient to form a polymerization reaction mixture comprising the poly-n-butene;

(g) withdrawing the polymerization reaction mixture from the reaction zone; and (h) recovering the poly-n-butene product from the withdrawn polymerization reaction mixture.

2. The process of claim 1 wherein the aluminum trichloride catalyst is introduced into said rection zone in an amount of from about 0.2 to 2 wt. % based on the weight of said introduced treated feedstream mixture.

3. The process of claim 1 wherein the poly-n-butene product has a molecular weight distribution of about 1.2 to 1.4.

4. The process of claim 1 wherein the poly-n-butene product has a viscosity of 5 to 30 centistokes at 100° C.

5. The process of claim 1 wherein the polymerization temperature is from about 20° C. to 60° C.

6. The process of claim 1 wherein the poly-n-butene has an $\overline{M}n$ of about 900 to about 2,500.

7. The process of claim 1 wherein the aluminum trichloride chloride is added in admixture with $C_4$ hydrocarbons.

8. A continuous process for preparing low molecular weight poly-n-butene having an $M_n$ in the range of about 300 to about 900, having a molecular weight distribution of less than about 1.4, and having less than about 10% by weight of light-end polymer of number average molecular weight less than or equal to about 250, said process comprising:

(a) providing a monomer feedstream comprising from 10 to 50 wt. % isobutylene; 1-butene, and 2-butene;

(b) selectively polymerizing the isobutylene to form a composition comprising polyisobutylene and unreacted monomers;

(c) separating the unreacted monomers from the polyisobutylene as an unreacted monomer feedstream, the unreacted monomer feedstream comprising less than 5% by weight isobutylene and at least about 12% by weight normal-buteness;

(d) injecting into unreacted monomer feedstream derived in accordance with step (c), an amount of HCl of from about 0.01 to 0.6 parts by weight per 100 parts by weight of said unreacted monomer feedstream, in the substantial absence of aluminum trichloride catalyst and under conditions sufficient to substantially completely react the injected HCl and thereby form 2-chlorobutane cocatalyst, thereby producing a treated unreacted monomer feedstream which contains less than 1.0 ppm free HCl;

(e) simultaneously continuously introducing the treated unreacted monomer feedstream mixture and aluminum trichloride chloride catalyst as separate streams into a reaction zone;

(f) contacting the introduced treated unreacted monomer feedstream mixture and the introduced catalyst in the reaction zone at from 10° C. to 90° C., for a time and under conditions sufficient to form a polymerization reaction mixture comprising the poly-n-butene;

(g) continuously withdrawing the polymerization reaction mixture from the reaction zone; and (h) recovering the poly-n-butene product from the 9. The process of claim 8 wherein said withdrawn polymerization reaction mixture is quenched with aqueous alkali and said poly-n-butene product is recovered from said quenched polymerization reaction mixture.

10. The process of claim 8 wherein the aluminum trichloride catalyst is introduced into said rection zone in an amount of from about 0.2 to 2 wt. % based on the weight of said introduced treated feedstream mixture.

11. The process of claim 8 wherein the poly-n-butene product has a molecular weight distribution of about 1.2 to 1.4.

12. The process of claim 8 wherein the poly-n-butene product has a viscosity of 5 to 30 centistokes at 100° C.

13. The process of claim 8 wherein the polymerization temperature is from about 20° C. to 60° C.

14. The process of claim 8 wherein the poly-n-butene has an $\overline{M}n$ of about 900 to about 2,500.

15. The process of claim 8 wherein the aluminum trichloride chloride is added in admixture with $C_4$ hydrocarbons.

16. The process of claim 15 wherein the aluminum trichloride catalyst is introduced into said rection zone in an amount of from about 0.2 to 2 wt. % based on the weight of said introduced treated feedstream mixture.

17. The process of claim 16 wherein the poly-n-butene product has a molecular weight distribution of about 1.2 to 1.4.

18. The process of claim 17 wherein the poly-n-butene product has a viscosity of 5 to 30 centistokes at 100° C.

19. The process of claim 18 wherein said withdrawn polymerization reaction mixture is quenched with aqueous alkali and said poly-n-butene product is recovered from said quenched polymerization reaction mixture.

20. A process for preparing poly-n-butene having a number average molecular weight of at least about 300, which process comprises:

(a) providing an unreacted monomer feedstream comprising isobutylene and a greater amount of 1-butene;

(b) injecting into said unreacted monomer feedstream an amount of HCl in the substantial absence of aluminum trichloride catalyst and under conditions sufficient to substantially completely react the injected HCl, thereby producing a treated unreacted monomer feedstream mixture which contains 2-chlorobutane and less than 1.0 ppm free HCl;

(c) introducing the treated unreacted monomer feedstream mixture into a reaction zone; and (d) contacting the introduced treated unreacted monomer feedstream mixture with a quantity of AlCl$_3$ catalyst in said reaction zone at a reaction temperature of no less than 10° C., for a time and under conditions sufficient to form a polymerization reaction mixture comprising the poly-n-butene;

(e) with the proviso that a substantial molar excess of said AlCl$_3$ catalyst over said injected HCl-at a concentration of said AlCl$_3$ catalyst of no greater than 2.0% by weight of said treated unreacted monomer feedstream mixture-be effective, under the reaction conditions and time employed, in converting at least about 80% of said 1-butene to polymer product.

21. The process of claim 20 wherein the mole ratio of said AlCl$_3$ catalyst to said injected HCl is at least about 1.3.

22. The process of claim 21 wherein the mole ratio of said AlCl$_3$ catalyst to said injected HCl is at least 2.

23. The process of claim 20 wherein the amount of HCl injected is no less than about 0.09 parts by weight per 100 parts by weight of said unreacted monomer feedstream.

24. The process of claim 20 wherein the amount of HCl injected is no less than about 2 parts per weight per 100 parts per weight of said isobutylene in said unreacted monomer feedstream.

25. The process of any of claims 1, 8 or 20 wherein said reaction of injected HCl is conducted to a temperature of no less than about 10° C.

* * * * *